(12) United States Patent
Romaine et al.

(10) Patent No.: US 8,860,572 B2
(45) Date of Patent: *Oct. 14, 2014

(54) APPARATUS, SYSTEM, AND METHOD FOR AUTOMATED ITEM TRACKING

(71) Applicant: Element ID, Inc., Bethlehem, PA (US)

(72) Inventors: John E. Romaine, Hellertown, PA (US); David L. Martin, Ewing, NJ (US)

(73) Assignee: Element ID, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,769

(22) Filed: Oct. 10, 2013

(65) Prior Publication Data

US 2014/0084054 A1 Mar. 27, 2014

Related U.S. Application Data

(63) Continuation of application No. 13/132,344, filed as application No. PCT/US2009/066797 on Dec. 4, 2009, now Pat. No. 8,581,722.

(60) Provisional application No. 61/193,520, filed on Dec. 4, 2008.

(51) Int. Cl.
| | |
|---|---|
| *G08B 1/08* | (2006.01) |
| *G06Q 10/08* | (2012.01) |
| *G01B 7/00* | (2006.01) |
| *G01B 7/28* | (2006.01) |
| *G06K 7/10* | (2006.01) |

(52) U.S. Cl.
CPC .............. *G06Q 10/087* (2013.01); *G01B 7/003* (2013.01); *G01B 7/281* (2013.01); *G06K 7/10455* (2013.01)

USPC .................... 340/539.13; 340/572.1; 340/10.1

(58) Field of Classification Search
USPC ...................................................... 340/539.13
See application file for complete search history.

(56) References Cited

U.S. PATENT DOCUMENTS

| | | | |
|---|---|---|---|
| 4,972,494 A | 11/1990 | White et al. | |
| 6,819,221 B1 * | 11/2004 | Amtmann et al. | 340/10.3 |
| 7,149,658 B2 * | 12/2006 | Kadaba | 702/184 |
| 7,334,729 B2 * | 2/2008 | Brewington | 235/383 |
| 7,377,429 B2 * | 5/2008 | Anderson et al. | 235/385 |
| 7,775,431 B2 * | 8/2010 | Skaaksrud et al. | 235/384 |
| 7,859,411 B2 * | 12/2010 | Chakraborty | 340/572.1 |
| 7,937,244 B2 * | 5/2011 | Kadaba | 702/184 |
| 8,581,722 B2 * | 11/2013 | Romaine et al. | 340/539.13 |
| 2002/0001091 A1 | 1/2002 | Wurz et al. | |
| 2004/0004119 A1 * | 1/2004 | Baldassari et al. | 235/384 |
| 2005/0116034 A1 * | 6/2005 | Satake et al. | 235/432 |

(Continued)

OTHER PUBLICATIONS

International Search Report and Written Opinion dated Feb. 5, 2010 for PCT/US09/66797.

*Primary Examiner* — Travis Hunnings

(74) *Attorney, Agent, or Firm* — Morgan, Lewis & Bockius LLP

(57) ABSTRACT

Disclosed is an automated item tracking method, comprising the steps of reading an RFID signal, obtaining a reported position of an RFID signal generator, measuring the strength of the read RFID signal, creating a read profile, obtaining a physical package profile, comparing the read profile to the physical package profile, and generating a weighted read profile to estimate an actual position of the RFID signal generator by comparing the weighted read profile with the physical package profile.

15 Claims, 4 Drawing Sheets

(56) References Cited

U.S. PATENT DOCUMENTS

| | | |
|---|---|---|
| 2005/0171738 A1 | 8/2005 | Kadaba |
| 2005/0189271 A1* | 9/2005 | Cerutti et al. ............. 209/583 |
| 2007/0063029 A1 | 3/2007 | Brandt et al. |
| 2007/0126578 A1* | 6/2007 | Broussard ............. 340/572.1 |
| 2007/0158417 A1* | 7/2007 | Brewington ............. 235/383 |
| 2008/0042901 A1 | 2/2008 | Smith et al. |
| 2008/0171738 A1* | 7/2008 | Redmond et al. ........ 514/222.5 |
| 2008/0172303 A1* | 7/2008 | Skaaksrud et al. ........... 705/26 |
| 2008/0191844 A1* | 8/2008 | Allen et al. ............. 340/10.2 |

\* cited by examiner

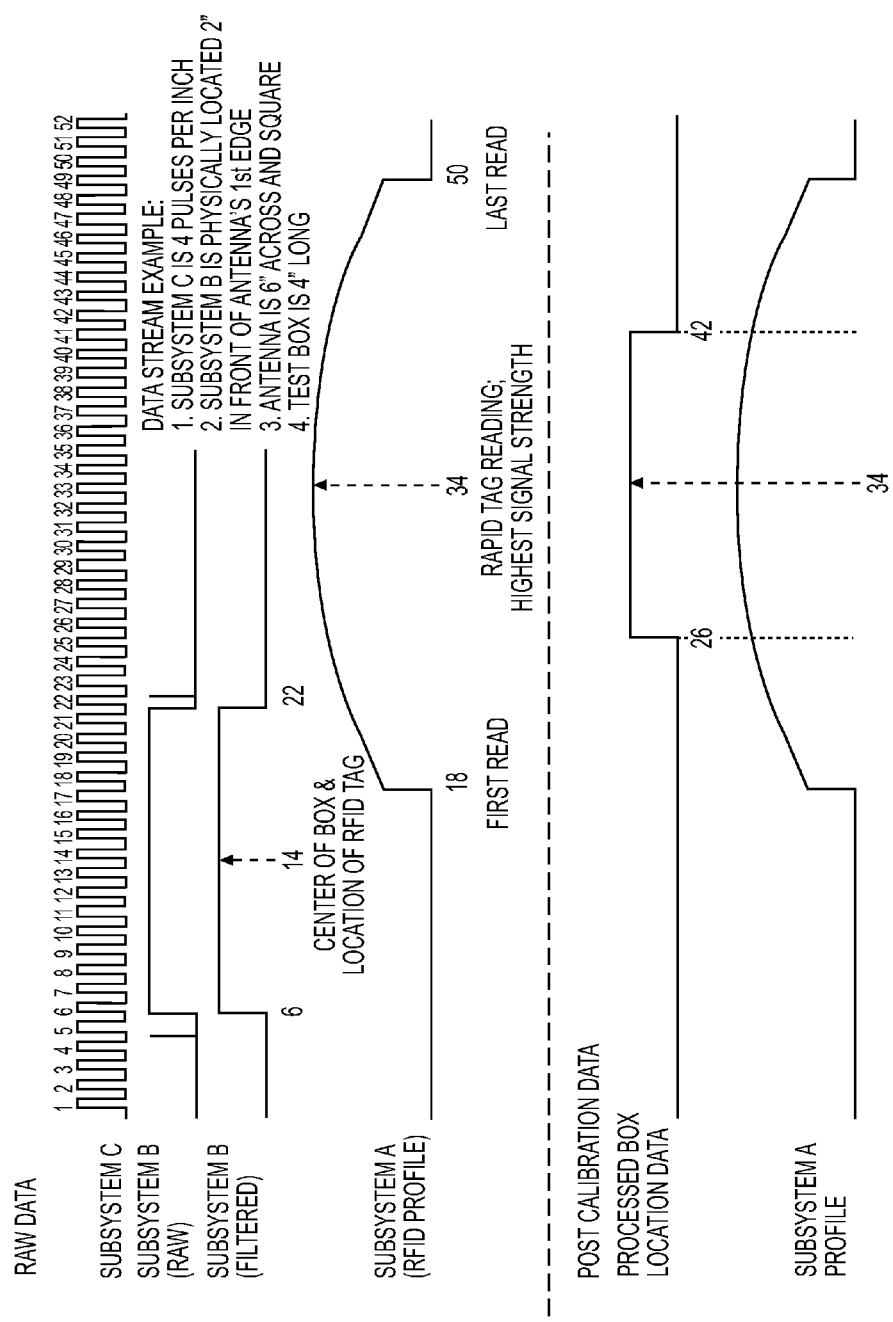

APPARATUS, SYSTEM, AND METHOD FOR AUTOMATED ITEM TRACKING

CROSS REFERENCE TO RELATED APPLICATIONS

This application is a continuation of U.S. patent application Ser. No. 13/132,344, filed Dec. 4, 2009, which is a National Stage Patent Application of International Application No. PCT/US2009/066797, filed Dec. 4, 2009, which claims the benefit of U.S. Provisional Patent Application No. 61/193,520, filed Dec. 4, 2008, each of which is incorporated herein by reference in its entirety.

FIELD OF THE INVENTION

The present invention relates to Radio Frequency Identification, or RFID technology, and more particularly to ways of correlating RFID data with a package traveling on a conveyor system or manufacturing line.

DISCUSSION OF THE RELATED ART

RFID readers are inherently inaccurate when it comes to determining an RFID signal generator position. RF read zone volumes are potentially much larger than the volume of the package carrying the RFID tag. The system can therefore read RFID tags from multiple packages within the read zone simultaneously or nearly simultaneously, without knowing where in the zone each RFID tag was read. This makes matching the RFID data with the correct package difficult, especially if multiple packages within an RF read zone are detected during the same read cycle. Therefore, while many systems collect RFID data, few can match the data to a physical item when there are multiple items with minimal spacing between them entering the system at high speeds.

Existing RFID methods of tracking and data correlation have many shortcomings. For example, while existing systems can read RFID tags in an automated conveyor environment, these systems lack the ability to correlate the RF data with the packages reliably, particularly when spacing is decreased. This prevents the system from helping the customer automatically divert a desired package (a TV, for example) to the correct location. For example, two packages are moving down a conveyor system in a warehouse. The first package contains a television destined for a first store. The second package contains paper towels destined for a second store. The warehouse has an automated diverter located ten feet and six inches down the conveyor from an equipment location. A customer wants to divert the package with the television, but not the package with the paper towels. In certain scenarios, existing systems mistakenly associate the RFID data from the package with the TV with RFID data for the package containing paper towels. The system then ships and bills the television to the customer requesting paper towels, and ships and bills the paper towels to the customer requesting the television. These errors are expensive to correct.

SUMMARY OF THE INVENTION

Accordingly, the present invention is directed to an apparatus, system, and method for automated item tracking that substantially obviates one or more problems due to limitations and disadvantages of the related art.

An object of the present invention is to provide a system that matches RFID data with packages moving at high speeds on conveyor systems or on manufacturing lines. This helps customers manage inventory by delivering reliable and actionable data to the customer at specific points in time or when a package reaches a specific location. Going back to the previous example, to avoid incorrectly diverting the package with the television, the system reads the RFID data on the package with the television and creates a weighted map of the read profile (based on number of reads, time between reads, and the strength of the RF signal), matches that profile to the first package profile, and transmits that data once the leading edge of the package reaches a predetermined position down the belt. The data is typically transmitted to the customer diverter system that routes packages, another type of automation controller, and/or a software database. A customer uses this data to divert the television package to a desired location, while leaving the package with the paper towels on the conveyor system.

Additional features and advantages of the invention will be set forth in the following description, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the apparatus, system, and method for automated item tracking includes an automated item tracking method, comprising the steps of reading an RFID signal, obtaining a reported position of an RFID signal generator, measuring the strength of the read RFID signal, creating a read profile, obtaining a physical package profile, comparing the read profile to the physical package profile, and generating a weighted read profile to estimate an actual position of the RFID signal generator by comparing the weighted read profile with the physical package profile. RFID signal generator is a generic term that refers to an RFID tag, RFID transponder, printed RFID resonance device, or any other source of RFID data known to those skilled in the art.

In another aspect, an automated tracking system includes means for reading an RFID signal, means for obtaining a reported position of an RFID signal generator, means for measuring the strength of the read RFID signal, means for creating a read profile, means for obtaining a physical package profile, means for comparing the read profile to the physical package profile; and means for estimating an actual position of the RFID signal generator by comparing the weighted read profile with the physical package profile.

In another embodiment, an automated item tracking system includes an RFID reader having an RF module, a processor, and an antenna, a package detector, a position indicator, and a processor, the processor operatively connected to the RFID reader, package detector, and position indicator.

Still another embodiment includes an automated item tracking system calibration method, comprising the steps of running a conveyor at a stable and measurable speed, placing a package of known dimensions on the conveyor, the package having an RFID signal generator in a predetermined position on the package, reading an RFID signal when the RFID signal generator is a known distance from an RFID reader, calculating a package position based on the read RFID signal, and calculating an offset based on the difference between the known package position and the calculated package position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 illustrates an exemplary embodiment of raw and post-calibration data obtained from an automated item tracker in accordance with the present invention.

DETAILED DESCRIPTION OF THE EXEMPLARY EMBODIMENTS

Reference will now be made in detail to the embodiments of the present invention, examples of which are illustrated in the accompanying drawings.

Figure 1:
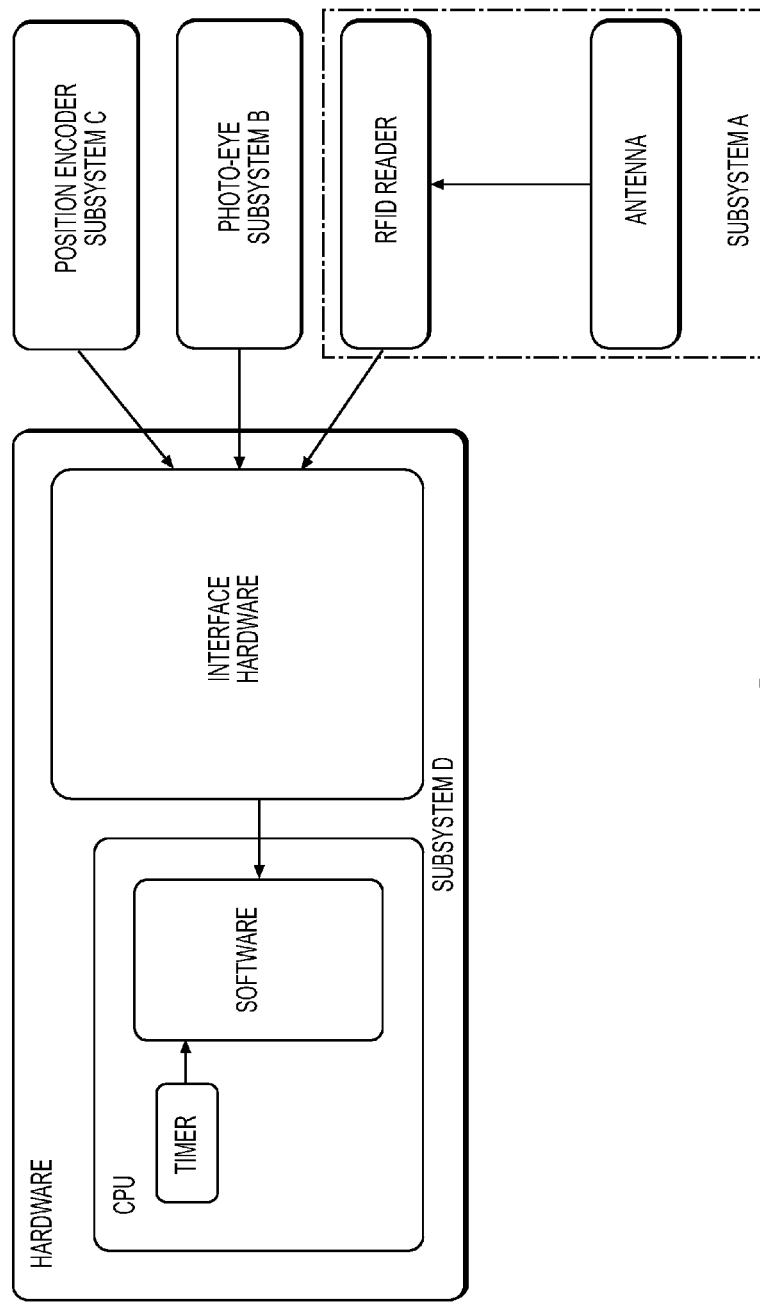
FIG. 1 is an exemplary block diagram showing an automated item tracker in accordance with the present invention.

FIG. 1 is an exemplary block diagram showing an automated item tracker in accordance with the present invention. As shown in FIG. 1, the system correlates near-accurate data streams from multiple sources (tachometers, photo eyes, PLC data, in-motion scales, barcode readers, sort controllers, etc) and an inaccurate data stream (RFID readers), with a physical item traveling on a conveyor system. The system has three subsystem inputs—Subsystem A, Subsystem B, and Subsystem C, which are described below. The system optionally includes a processing subsystem (Subsystem D) that may be independent or combined with Subsystem A.

In the exemplary embodiment shown in FIG. 1, the processing subsystem uses RFID data from Subsystem A to create a weighted read profile, which is created, in part, with signal strength hardware and RFID signal generator read counting software. The signal strength is gathered from the underlying hardware, and recorded for each valid read of the RFID signal generator. The weighted read profile is a software representation of the raw data obtained from the subsystems. Each time the RFID signal generator is read, the position obtained from Subsystem C (discussed below) is recorded, and the strength of the signal obtained from the hardware is recorded. All position and strength data associated with an individual RFID signal generator are used to create a profile. Additionally, the first and last time an RFID signal generator is read and the number of times an individual RFID signal generator is read is used in the profile. This profile is compared to a physical package profile from Subsystem B (discussed below), and used to identify the location of the RFID signal generator in the physical world.

Figure 2:
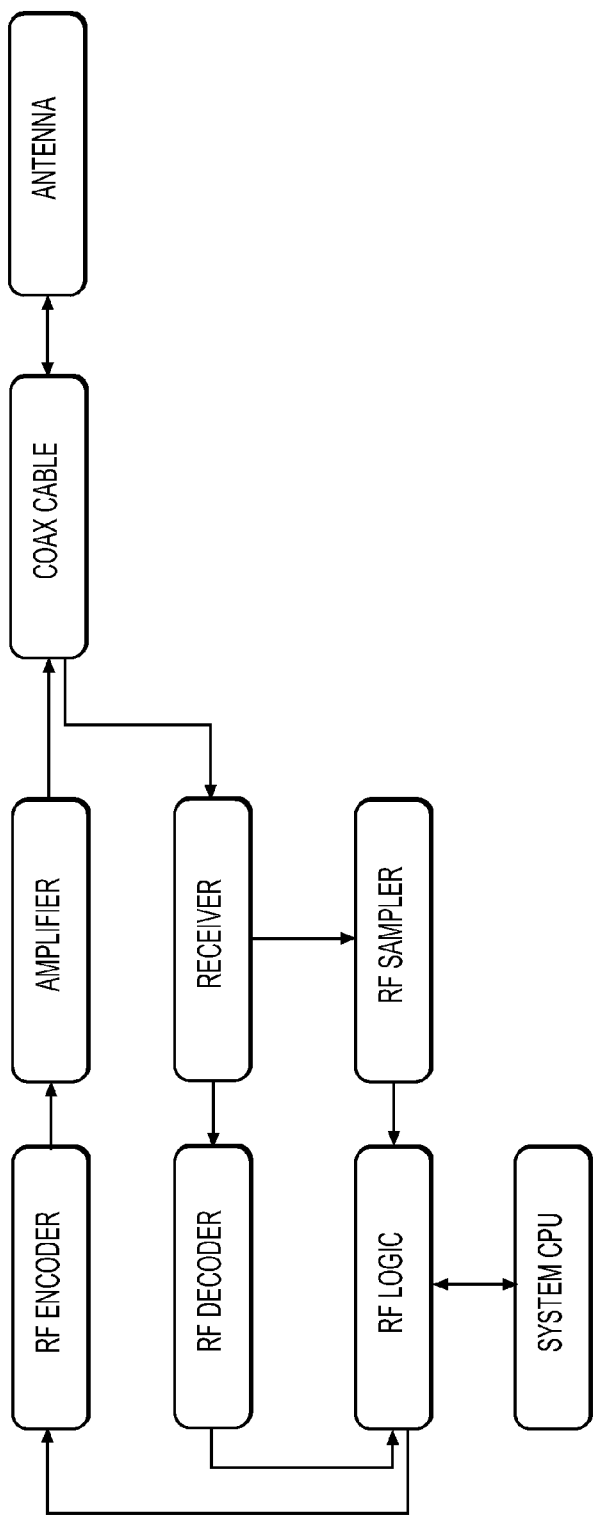
FIG. 2 is an exemplary block diagram of an RFID reader in accordance with the present invention.

In the embodiment shown, Subsystem A is the RFID reader, also called an interrogator, that facilitates a wireless communication with an RFID signal generator placed on an item the user wishes to identify, locate, or track. The RFID reader that makes up Subsystem A passes a continuous stream of RFID data, the time between reads, and the read signal strength to the processing subsystem (Subsystem D). Subsystem A includes the hardware needed to read RFID signal generators including, but not limited to, an RF module, processor, and antenna. FIG. 2 is an exemplary block diagram of an RFID reader for use with Subsystem A.

In the embodiment shown in FIG. 1, Subsystem B is a photoeye signal generator. The photoeye uses beam-breaking detection to indicate the presence or absence of an object. The photoeye signal generator is exemplary only, and not limited to what is shown. This signal from Subsystem B could also be generated from a camera system, a structured light patterns system (height delta detecting systems), or other system known to those skilled in the art that provides a representation of the physical items to be tracked.

In the embodiment shown in FIG. 1, Subsystem C is a timing/position system. Any speed/position sensor can be used, such as a pulse position indicator, an artificially generated pulse train representative of conveyor speed/position (for example a signal generated by a programmable logic controller), or other devices for conveyor or assembly line control known to those skilled in the art.

Figure 3:
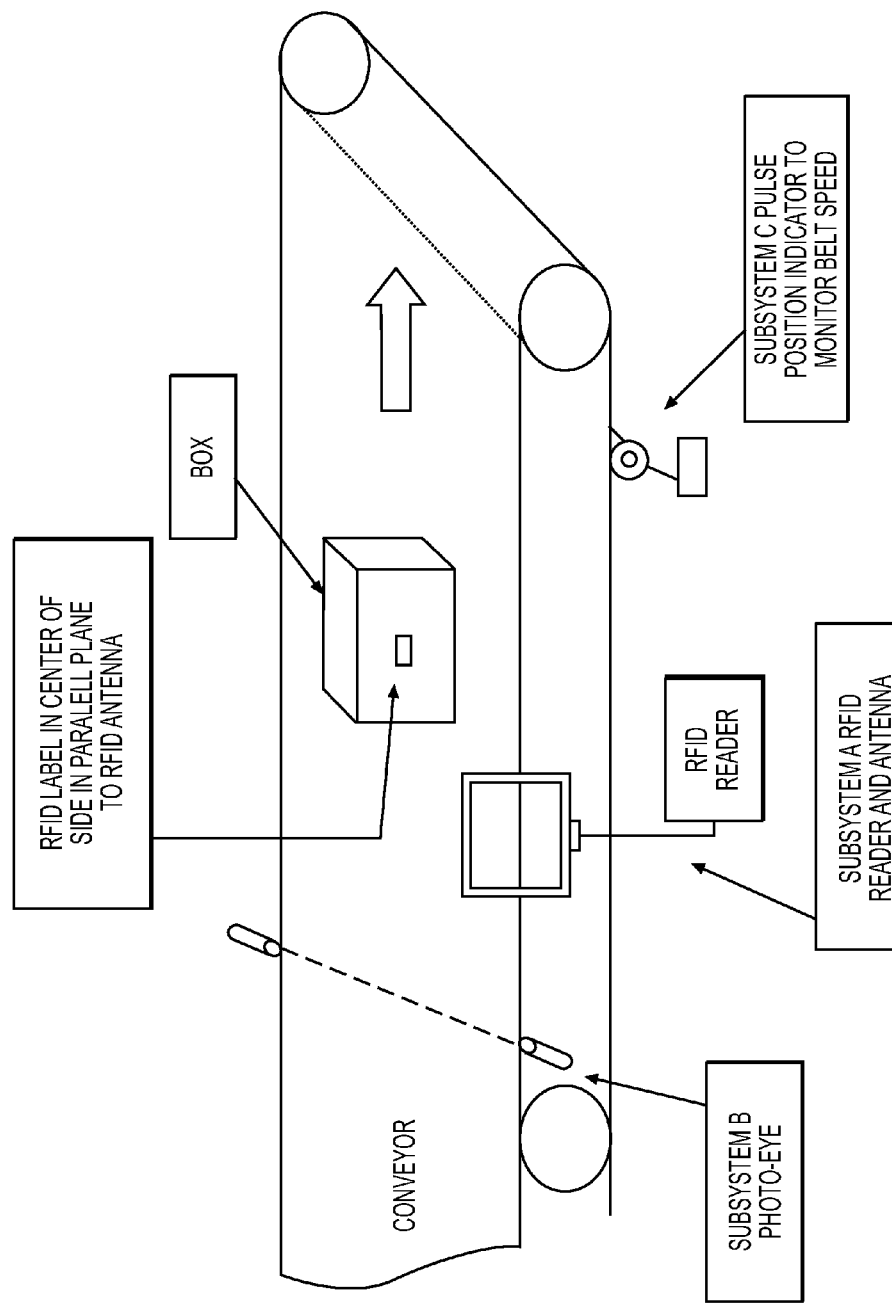
FIG. 3 is an exemplary embodiment of an automated item tracker physical configuration in accordance with the present invention.

FIG. 4 illustrates the data streams and an exemplary method of calibrating the system shown in FIG. 3. During system setup of the system shown in FIG. 3, a specific calibration process is used to learn the physical environment. A sample package with an RFID signal generator that is placed in the exact middle of the package side facing the RFID read antenna is placed on the conveyor running at a desired speed, and the sample package is run through the system multiple times. Data recorded from Subsystems A-C is recorded by the processing subsystem (Subsystem D). The processing subsystem then averages the data and stores parameters representing the offsets between each subsystem. These offsets can be thought of as mapping parameters that the system uses to map the three subsystems to a common coordinate system. For example, assume a pulse position indicator (Subsystem C) is used that offers resolution of four pulses per inch. Additionally, assume the photoeye (Subsystem B) is physically mounted two inches in front of the leading edge of the RFID antenna. Finally, assume the RFID antenna in Subsystem A is a six-inch square antenna. Because each antenna and environment may produce a different RF field that has the potential to read RFID signal generators at different locations, the system must "learn" where the center of the RF field is. This is the purpose of the calibration. The system would also evaluate the start and end pulse where RFID signal generators were read and the signal level at each of those points. In the present example, suppose the sample RFID signal generators in the calibration run are placed on the center of a 4" long box and show maximum read rate, and highest signal level 34 pulses from the first instance the photoeye beam was broken, on average. Additionally, assume the first read occurred at 18 pulses and the last read at 50 pulses. Subsystem B would indicate the box in our example was 16 pulses long starting at pulse 6 and ending at pulse 22. Using this information, the processing subsystem would conclude that the center of the RFID read field is 20 pulses past the center of the box as indicated by the data stream from Subsystem B, or 5", in our example. The processing subsystem (Subsystem D) would use the offset to shift all future photoeye data by 20 pulses to match the data from Subsystem A with that of Subsystem B.

In another embodiment of the invention, the system generates a confidence factor that indicates the reliability of the information passed to an upstream device (e.g., a customer PLC, a server, etc). This goes beyond a simple "quality of read indicator", by also incorporating the reliability of the correlation of the RFID signal generator with the physical item. Subsystems A-C work together to gauge the likelihood that accurate information was obtained from each subsystem, and estimate the likelihood that the data has been matched correctly. Exemplary embodiments of input Subsystems A-C and the processing subsystem (Subsystem D) are discussed below.

Subsystem A is an RFID reader that feeds signal strength, and RFID read data and RFID read data timing to the processing subsystem (Subsystem D) in order to build a weighted read profile. The signal strength hardware is part of an RFID radio and provides an indication of the signal strength of the RFID signal generator signal as received at the reader. The signal strength is most often affected by RFID signal generator orientation in relation to a reader's antenna and the RFID signal generator's distance from the antenna. Signal strength can also be affected by overall system power and RFID signal generator quality. Signal strength and RFID signal generator quality vary by system set up, but then remain constant. RFID readers can operate at different power and RFID signal generators of different size will produce different signal strength, but once a system is set up, the signal strength due to these factors should not vary. Readers are designed to a certain specification and this causes signal strength due to system power and RFID signal generator quality to be known at time of manufacture and the expected strength value to be stable and constant for a given product model. In other words, once a reader's power is set and/or an RFID signal generator of particular size is chosen, the signal strength produced is expected to be constant. Now, by varying the RFID signal generator orientation and/or distance, a relative change in signal strength can be measured. The farther away the RFID signal generator is from the antenna, the lower the signal strength. An RFID signal generator produces maximum signal strength when it is in a plane parallel to the reader's antenna plane. Signal strength is minimized when the RFID signal generator is in a plane orthogonal to the reader antenna and the signal strength varies at angles in between. The system uses relative changes in signal strength to gather information about how well it is communicating with a given RFID signal generator. The RFID data and RF signal strength are inherently associated with the weighted read profile, since the read data and the signal strength are gathered at the same time as the reading occurs. Higher signal strength and an increase in the number of times an RFID signal generator is read in a given time period are directly correlated with a better quality transfer of data between the reader and RFID signal generator.

Subsystem B is a generic package detection device, such as a simple optical package detector (photo-eye), or possibly a more sophisticated height change detection system (camera, light curtain, etc). The subsystem applies filters to the data to eliminate system noise and signals that do not fall within package parameter data. In the present embodiment, the filters are comparators that pass data along to the next stage if the package parameter data is greater than a low threshold and less than a high threshold. Data not meeting these criteria are discarded. For instance, a system may expect boxes that are between approximately 4" long and approximately 36" long. The filter will eliminate inputs falling outside of this range. These eliminated inputs can be caused by, for example, loose debris in the system, or boxes outside the desired parameters that are inadvertently placed in the system.

Subsystem C of this exemplary embodiment is a generic belt speed/position indication square wave, such as what is generated by a pulse position indicator or artificial signal from a programmable logic controller that is indicative of the automated system speed.

The processing subsystem (Subsystem D) collects data from each subsystem. The module collects data using, for example, software drivers or other collection modules known to those skilled in the art. The data from Subsystems A-C is then correlated. Subsystems B and C have defined data streams, and are correlated through simple calibration offsets. For example, Subsystem C may produce an electrical pulse for each inch of conveyor belt travel. So four pulses occurring in one second would equate to a belt speed of 4" per second. Subsystem B may be a photoeye and typically will exhibit a change of electrical state when a box traveling on the conveyor first breaks its beam path. It will then return to its original state once the box exits the beam path. Subsystem A is correlated to Subsystems B and C by comparing the weighted read profile of Subsystem A with the carton profile map of Subsystems B and C.

The system then generates an output rating that increases as confidence in the correlation increases. The confidence in the correlation rating increases proportionally to how well the weighted read profile matches the package profile. The output rating is represented as, for example, a two digit percentage from 0 to 100. Factors that increase the confidence include, but are not limited to: (1) increased package spacing, (2) a high RFID signal strength, (3) multiple reads of the same RFID data, (4) a consistent Subsystem C data rate indicative of a constant rate of travel through the subsystems, and (5) relatively little filtering of data from Subsystem B inputs. Increased package spacing decreases the likelihood of two Subsystem A profiles overlapping data from Subsystems B and C. High RFID signal strength and an increase in RFID data reads in a given period of time increases the likelihood the RFID signal generator and reader are communicating well and that the RFID signal generator is directly in front of Subsystem A. Having the RFID signal generator directly in front of the Subsystem A antenna maximizes the advantage of the calibration procedure and the correlation of data profiles from the different subsystems. Consistent data from Subsystem C indicates the item to be detected is moving through the system at an orderly rate of speed. If the item were to stop and start or change speed rapidly, the calibration factors become less effective because the relationships between the subsystems become non-linear. An increase in filtering of data from Subsystem B has the potential to distort the item profile from that subsystem. Input data that does not need to be filtered increases the likelihood that the Subsystem B profile is accurate. Other factors may be considered without departing from the scope of the invention.

It will be apparent to those skilled in the art that various modifications and variations can be made in the apparatus, system, and method for automated item tracking without departing from the spirit and scope of the invention. Thus, it is intended that the present invention cover the modifications and variations of this invention provided they come within the scope of the appended claims and their equivalents.

What is claimed is:

1. An automated item tracking method, comprising the steps of:
   reading an RFID signal associated with an item;
   obtaining a reported position of the item;
   measuring the strength of the read RFID signal;
   creating a read profile;
   obtaining a physical package profile of the item;
   comparing the read profile to the physical package profile;
   generating a weighted read profile of the item; and
   estimating an actual position of the item by comparing the weighted read profile with the physical package profile.

2. The automated item tracking method of claim 1, wherein the reported position of the item is obtained using an optical package detector.

3. The automated item tracking method of claim 1 further comprising the step of:
   discarding a data reading that falls outside the physical package profile.

4. The automated item tracking method of claim 3 further comprising the step of:
   counting the number of discarded data readings.

5. The automated item tracking method of claim 1 further comprising the step of:
   recording the first time, the last time, and the total number of times an RFID signal is read.

6. The automated item tracking method of claim 1 further comprising the step of:
   generating a confidence factor,
   wherein the confidence factor increases as the difference between the weighted read profile and the physical package profile decreases.

7. The automated tracking method of claim 1, wherein the reported position of the item is obtained using a tachometer.

8. The automated tracking method of claim 1, wherein the reported position of the item is obtained using a barcode reader.

9. The automated tracking method of claim 1, wherein the reported position of the item is obtained using an in-motion scale.

10. The automated tracking method of claim 1, wherein the reported position of the item is obtained using a camera system.

11. The automated tracking method of claim 1, wherein the reported position of the item is obtained using a structured light patterns system.

12. The automated tracking method of claim 1, wherein the reported position of the item is obtained using a dimension detection system.

13. The automated tracking method of claim 1 further comprising:
   routing the item along a travel path based on an identity of the item and the estimated actual position of the item.

14. An automated item tracking system, comprising:
   means for reading an RFID signal associated with an item;
   means for obtaining a reported position of the item;
   means for measuring the strength of the read RFID signal;
   means for creating a read profile;
   means for obtaining a physical package profile of the item;
   means for comparing the read profile to the physical package profile;
   means for generating a weighted read profile of the item; and
   means for estimating an actual position of the item by comparing the weighted read profile with the physical package profile.

15. An automated item tracking system calibration method, comprising the steps of:
   running a conveyor at a measurable speed;
   placing a package on the conveyor, the package having an RFID signal generator on the package;
   reading an RFID signal repeatedly and recording the change in distance of the RFID signal generator;
   calculating a package position based on the read RFID signal; and
   calculating an offset based on the difference between a known package position and the calculated package position.

* * * * *